(12) United States Patent
Futamase

(10) Patent No.: US 9,129,275 B2
(45) Date of Patent: Sep. 8, 2015

(54) POS DEVICE

(71) Applicant: Maki Futamase, Kanagawa (JP)

(72) Inventor: Maki Futamase, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/376,467

(22) PCT Filed: Feb. 20, 2013

(86) PCT No.: PCT/JP2013/000941
§ 371 (c)(1),
(2) Date: Aug. 4, 2014

(87) PCT Pub. No.: WO2013/132765
PCT Pub. Date: Sep. 12, 2013

(65) Prior Publication Data
US 2015/0039615 A1    Feb. 5, 2015

(30) Foreign Application Priority Data
Mar. 9, 2012  (JP) ................ 2012-052835

(51) Int. Cl.
*G06F 17/30* (2006.01)
*G06Q 20/20* (2012.01)
*G06F 11/34* (2006.01)
*G07G 1/12* (2006.01)
*G06Q 30/06* (2012.01)

(52) U.S. Cl.
CPC ............. *G06Q 20/20* (2013.01); *G06F 11/34* (2013.01); *G06F 17/30091* (2013.01); *G06F 17/30097* (2013.01); *G06Q 30/06* (2013.01); *G07G 1/12* (2013.01); *G06F 11/3476* (2013.01)

(58) Field of Classification Search
CPC ................................. G06F 17/30097
USPC .......... 707/688–692, 999.2; 705/14
See application file for complete search history.

(56) References Cited

U.S. PATENT DOCUMENTS

2007/0073589 A1* 3/2007 Vergeyle et al. ............. 705/14

FOREIGN PATENT DOCUMENTS

| CN | 1536788 A | 10/2004 |
|---|---|---|
| CN | 1684041 A | 10/2005 |
| CN | 1776649 A | 5/2006 |
| CN | 101122924 A | 2/2008 |

(Continued)

OTHER PUBLICATIONS

International Search Report for PCT/JP2013/000941 dated May 7, 2013.

(Continued)

*Primary Examiner* — Syling Yen
(74) *Attorney, Agent, or Firm* — Sughrue Mion, PLLC

(57) ABSTRACT

An embodiment of a POS system according to the present invention stores log information and RAS information into a storage device (11) which stores an operating system, an application program and the like without being equipped with any non-volatile memories for storing the log information and the RAS information, wherein the log information is a record of a process, an operation and the like; and the RAS information is information pertaining to a hardware life-time. The POS device does not need to be equipped with a nonvolatile memory which is different from a storage device to store an operating system (OS), an application program and the like. Nevertheless the POS device is able to retain log information, RAS information and the like.

4 Claims, 4 Drawing Sheets

(56) References Cited

FOREIGN PATENT DOCUMENTS

| JP | 7-296070 A | | 11/1995 |
|----|----|----|----|
| JP | 07296070 A | * | 11/1995 |
| JP | 2002-092745 A | | 3/2002 |
| JP | 2004-220400 A | | 8/2004 |
| JP | 2004220400 A | * | 8/2004 |
| JP | 2009-129175 A | | 6/2009 |

OTHER PUBLICATIONS

Japanese Office Action for Japanese Patent Application No. 2012-052853 dated Apr. 23, 2013.

Communication dated Jun. 16, 2015, issued by the State Intellectual Property Office in the People's Republic of China in corresponding Chinese Application No. 201380012203.6.

* cited by examiner

POS DEVICE

CROSS REFERENCE TO RELATED APPLICATIONS

This application is a National Stage of International Application No. PCT/JP2013/000941 filed Feb. 20, 2013, claiming priority based on Japanese Patent Application No. 2012-052835, filed Mar. 9, 2012, the contents of all of which are incorporated herein by reference in their entirety.

TECHNICAL FIELD

The present invention relates to a POS (Point Of Sales) Device.

BACKGROUND ART

Conventionally a POS device to record log information which is the record of processing or operation, or information related to hardware life-time has been known.

The log information means information related to histories of data processing performed in a CPU (Central Processing Unit) mounted in the POS device, or the operation of the other hardware device mounted in the POS device. Further, the information related to hardware life-time means the information related to the number of times a keyboard is pushed down, the number of times a cash drawer is opened, and the number of times of scanning operations performed by a magnetic card reader, the number of times a back-light of LCD (Liquid Crystal Display) is energized, the number of letters printed by a printer, the number of times of operations of a cutting mechanism of a printer and the like. The information for the hardware life-time is used for estimating the life-time of the hardware components of the POS device.

The information for the hardware life-time is typically called RAS (Reliability, Availability and Serviceability). Therefore, in the description below, the information for the hardware life-time is named as RAS information.

Patent literature 1 discloses a POS device equipped with a nonvolatile memory in addition to a storage device to store an operating system (OS), an application program and the like (e.g. a hard-disk drive (HDD)). The nonvolatile memory stores history information.

CITATION LIST

Patent Literature

Patent literature 1: Japanese Unexamined Patent Application Publication No. 2009-129175

SUMMARY OF INVENTION

Technical Problem

However, a POS device is equipped with a nonvolatile memory for storing history information in addition to a hard-disk drive (HDD)).

The present invention has been made in order to solve such a problem and aims to provide a POS device which is not limited to be equipped with a nonvolatile memory which is different from a storage device to store an operating system (OS), an application program and the like, nevertheless it can retain log or RAS information.

Solution to Problem

An embodiment of a POS system according to the present invention without being equipped with any non-volatile memories for storing log information and RAS information, stores the log information and the RAS information into a storage device which stores an operating system, an application program and the like, wherein the log information is a record of a process, an operation and the like; and the RAS information is information pertaining to a hardware life-time.

Advantageous Effects of Invention

The present invention can provide a POS device which is able to retain log information, RAS information and the like. The POS device does not need to be equipped with any nonvolatile memory which is different from a storage device to store an operating system (OS), an application program and the like.

BRIEF DESCRIPTION OF DRAWINGS

FIG. 3 is a figure showing a processing flow to store a RAS information file at the rearmost area of the storage area in the storage device which stores an operating system and the like;

DESCRIPTION OF EMBODIMENTS

Embodiments

Figure 1:
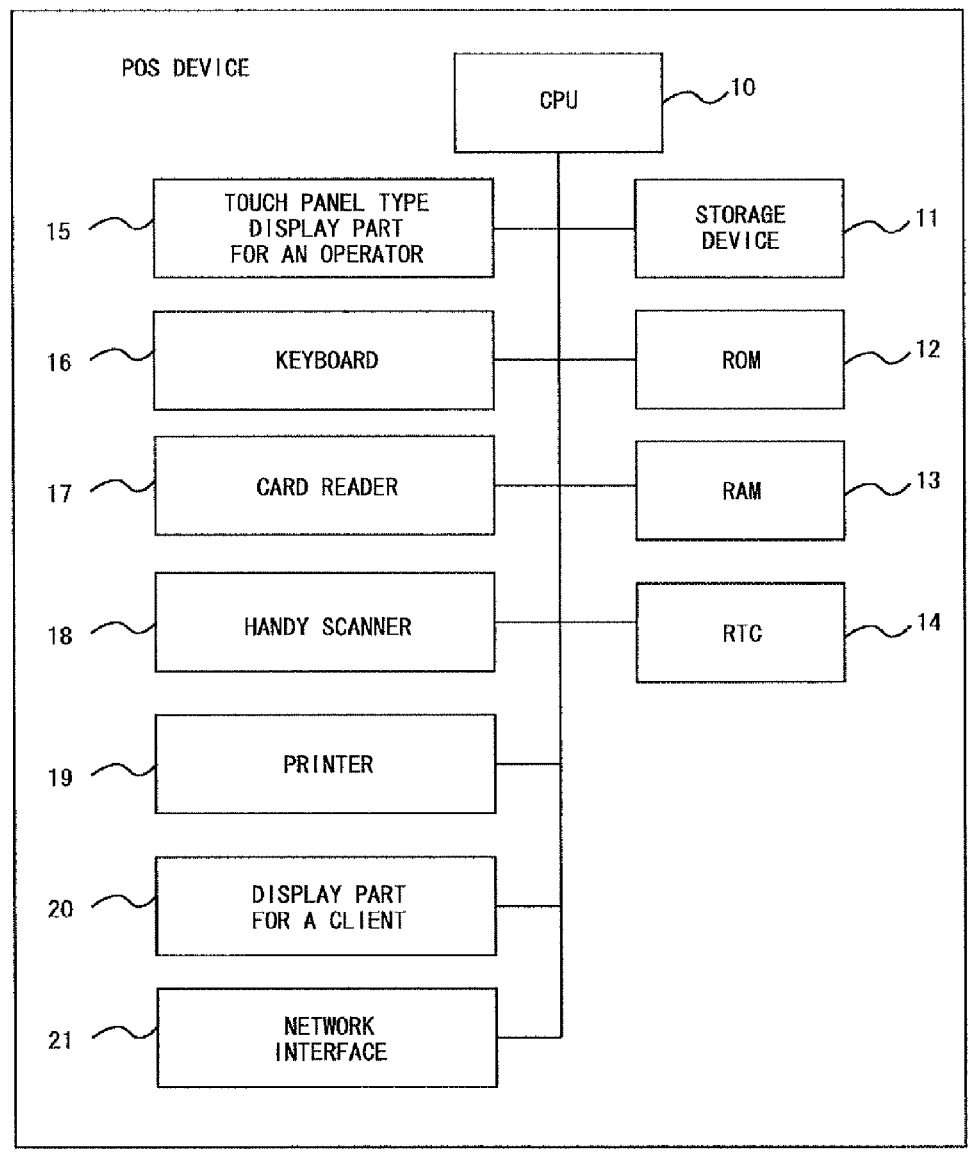
FIG. 1 is a block diagram showing a POS device according to the present invention.

FIG. 1 is a figure showing a POS device according to the present invention. The POS device includes a CPU (Central Processing Unit) (10) to control the POS device and a storage device (11) which stores an operating system (OS), an application program and the like.

Furthermore, the POS device has a ROM (Read Only Memory) (12) to store a control program, a RAM (Random Access Memory) (13) to store a data, an RTC (Real Time Clock) (14) to generate a date and time data, a touch panel type display unit for an operator (15), a keyboard (16), a card reader (17), a handy scanner (18), printer (19), a display unit for a client (20) and a network interface (21), but it does not include any non-volatile memory. In addition, the POS device according to the present invention is not limited to be equipped with all the components listed above. Furthermore, other hardware components can be added into the listed members except for a non-volatile memory.

The storage device (11) can be constituted of a hard-disk drive (HDD). The storage device (11) is not limited to any storage device, except that the storage device (11) is a storage device storing an operating system (OS), an application program and the like. The storage device (11) can be constituted of another storage device, provided that it has functions equivalent to those of an HDD (Hard Disk Drive).

The storage device (11) stores at least one of log information and information pertaining to hardware life-time (RAS information). The log information means information related to histories of data processing performed in a CPU (10) mounted in the POS device, or the operation of the other hardware device mounted in the POS device. Further, the information related to hardware life-time means the information related to the number of times a keyboard is pushed down, the number of times a cash drawer is opened, and the number of times of scanning operations performed by a magnetic card reader, the number of times a back-light of LCD (Liquid Crystal Display) is energized, the number of letters printed by a printer, the number of times of operations of a cutting mechanism of a printer and the like.

The RAS information is used for estimating the life-time of the hardware member of the POS device. In addition, the RAS information is stored in the storage device (11) and retained in the rearmost area of the storage area to prevent the RAS information data from vanishing by a copying (overwriting) operation performed upon an update for the operating system (OS), the application program and the like stored in the storage device (11).

Figure 2:
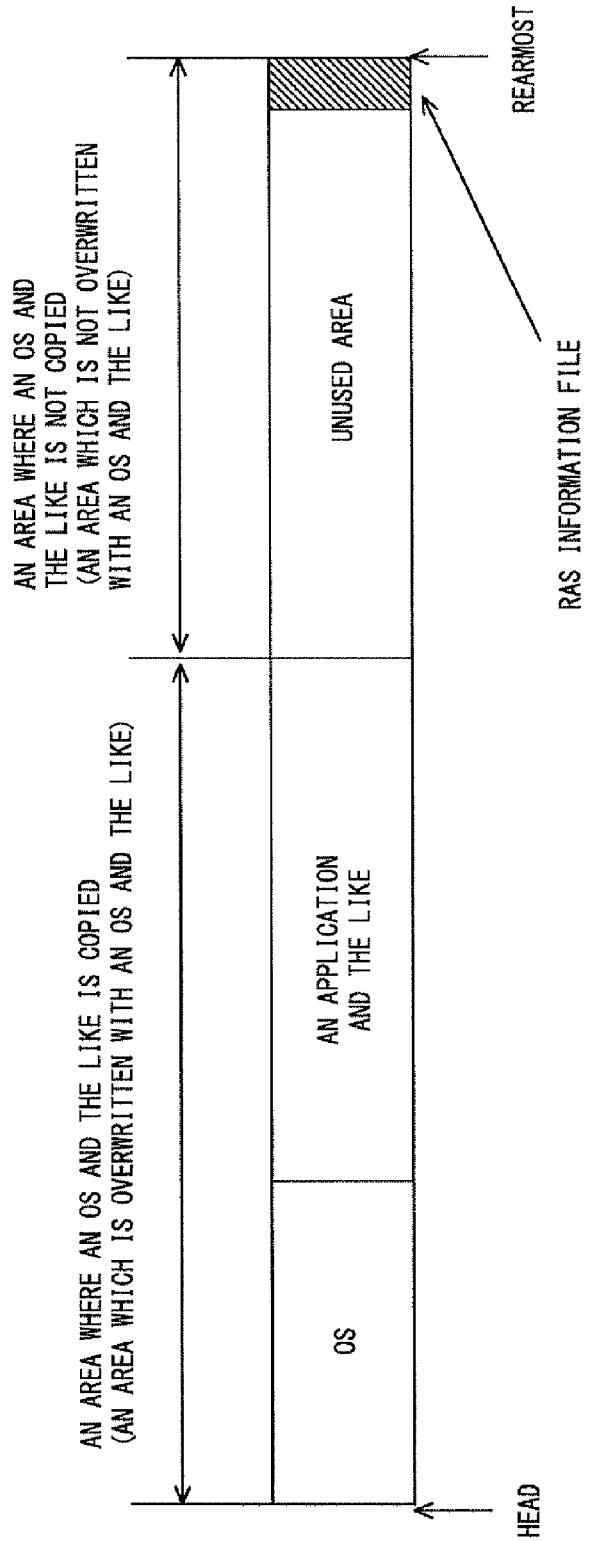
FIG. 2 is a figure showing a storage area in a storage device of the POS device according to the present invention.

Here, a processing method to retain the log information, RAS information and the like in the storage device (11) is explained. FIG. 2 is a figure showing a storage area in a storage device (11) of the POS device according to the present invention. The operating system (OS), the application program and the like are copied into the storage device (11) which is in a vacant state (initialized state). After that, a file for log information, RAS information and the like are generated and stored into the storage device (11).

In addition, the operating system (OS) is stored in the head area of the storage area which is followed by an area where an application program, a file (a file necessary at the time of executing the application program), drivers to control the POS device, and utilities to provide a POS device function are stored. That is followed by an unused area. Then, the RAS information file is stored at the rearmost area of the storage area.

Furthermore, the term "applications and the like" means an application program, a file necessary at the time of executing the application program, drivers to control the POS device, and utilities to provide a POS device function hereinafter.

The operating system (OS), the application program and the like are copied into the storage device (11) (the storage device (11) is overwritten with the operating system (OS), the application program and the like). This operation is performed, for example, by setting a tool containing a program for copying the operating system and the like and original data for copying. In addition, the operating system (OS), the application program and the like are copied in "the already installed state". Therefore an "installing" process is not necessary after the copy.

In FIG. 2, the storage area in the storage device (11) to store the operating system (OS) and the like is partitioned into two areas, i.e., an area where the operating system and the like are copied (an area which is overwritten with the operating system and the like) and an area where the operating system and the like are not copied (an area which is not overwritten with the operating system and the like). The original data for copying is created to contain no vacant area between the operating system, the application program and the like at the time of copying (overwriting with) the operating system and the like.

The copying (overwriting) of the operating system and the like is performed before the POS device is used and while the storage device (11) is in the initiated state. Furthermore this operation is performed at the time when the versions of the operating system and the like are upgraded after the use of POS device, at the time of restoration from an accident, or the like. However RAS information needs to be continuously recorded unless the hardware constituting the POS device is replaced to a new component(s). Therefore, it is necessary to prevent the RAS information from being deleted by copying of (overwriting with) the operating system or the like.

Only data of the storage device (11) are overwritten when the version of the operating system and the like has been upgraded after the use of the POS device. Furthermore this operation is performed when the copying (overwriting) of the operating system and the like is performed at the time of restoration from an accident, or the like. However the storage device (11) is not initialized at those times. Therefore data are not overwritten in an area following the operating system and the like. That is, the previous data are retained as they are.

In this manner, the RAS information file is stored in the area where the operating system and the like are not copied (the area which is not overwritten with the operating system and the like). The RAS information file should be stored in an area where the operating system and the like are not copied (an area which is not overwritten with the operating system and the like). Furthermore, the rearmost area is the most suitable for an area where the RAS information file is stored. Therefore the use of the rearmost area prevents the loss of RAS information, even if the area where the operating system and the like are copied (an area which is overwritten with the operating system and the like) becomes larger than the initial size when the versions of the operating system and the like are upgraded.

Note that FIG. 2 does not state the log information file. However the log information file is also generated by a program to generate log information program and then stored in a storage area following the storage area where the operating system and the like are stored. Only the most recent process, operation and the like should be stored as the log information. Therefore the log information is not limited to be continuously recorded before and after the copying (overwriting) of the operating system and the like. Therefore a file related to the log information is not limited to be stored in the rearmost area. However it can be stored into the rearmost area together with the RAS information.

Figure 3:
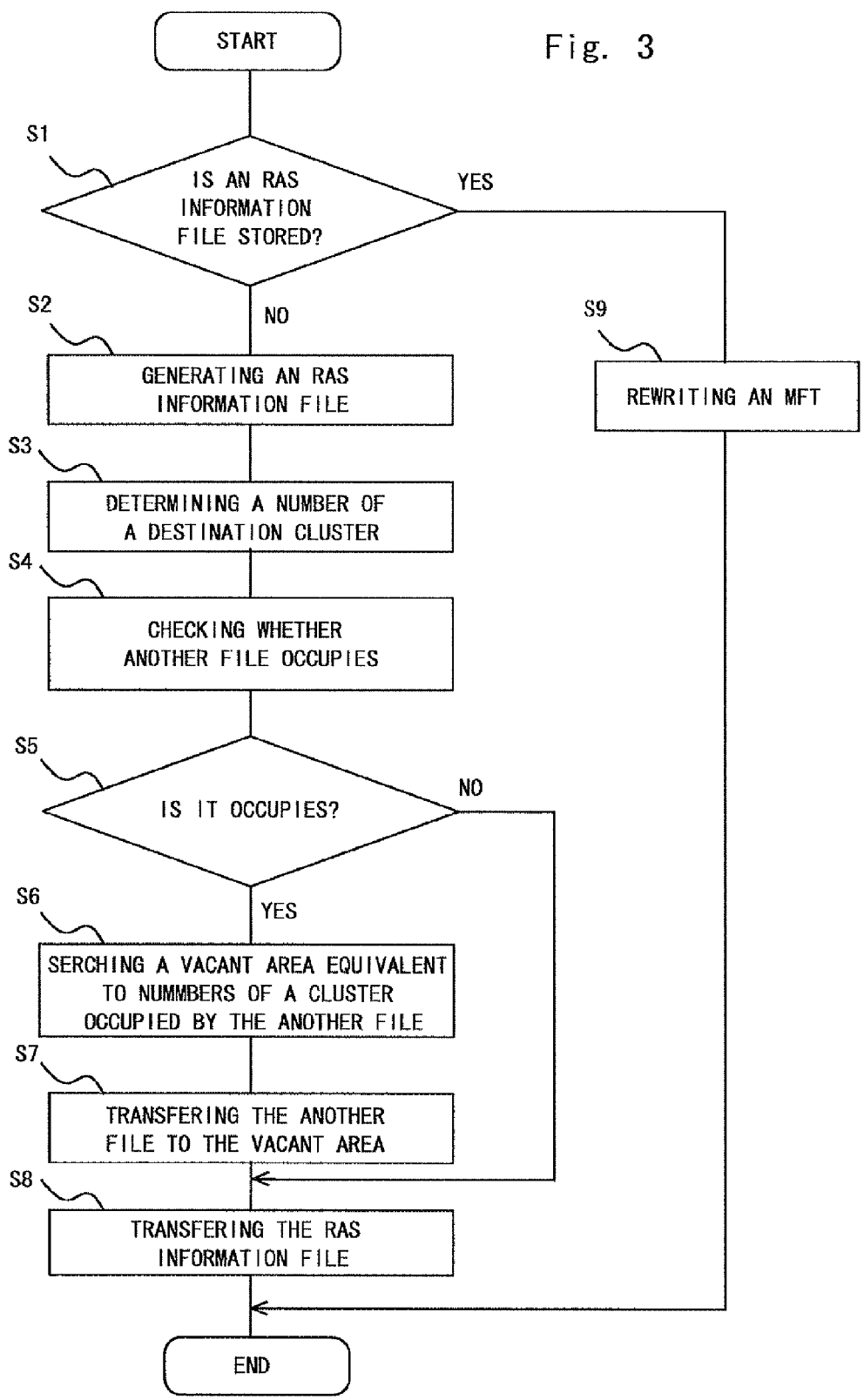

Next a flowchart in FIG. 3 is referred to. A process to store the RAS information into the rearmost area of the storage area in the storage device (11) which stores the operating system (OS) and the like is explained.

The POS device is powered on after copying (overwriting) of the operating system. Then a program to generate and store the RAS information file starts to perform the following processes.

First, it is checked whether the RAS information file is stored in the rearmost area or not (STEP 1). At this process, it is determined whether the stored data is the RAS information file of the aforementioned POS device or not. For this determination, when a RAS information file exists, it is verified whether the read serial-number of the mother board of the aforementioned POS device is the same as the serial-number of the mother board stored in the RAS information file. It is determined that the aforementioned RAS information file is stored (YES for STEP 1) when the RAS information file exists and the read serial-number of the mother board of the aforementioned POS device is the same as the serial-number of the mother board stored in the aforementioned RAS information file. In the other cases, it is determined that the RAS information file is not stored (NO for STEP 1).

In the case that the aforementioned RAS information file is stored (YES for STEP 1), an MFT (Master File Table) is rewritten so as to indicate that the RAS information file is located in the rearmost area of the storage area (STEP 9). The MFT is a file for managing all file entries which are located in a file system in conformity to the NTFS (NT File System). Then the process finishes.

The MFT has not been recorded so as to indicate that the RAS information file is located in the rearmost area of the storage area in the case that the RAS information file is stored in the storage area (YES for STEP 1), i.e., after the first copying (overwriting) of the operating system and the like. Therefore the MFT is rewritten so as to indicate that the RAS information file is located in the rearmost area of the storage area.

On the other hand, the RAS information file is generated and stored into the storage device (11) in the case that the RAS information file has not been stored (NO for STEP 1). The RAS information file is stored in an area following the area where the application program, the file, and the like in FIG. 2. However the exact storing location of the RAS information file is undetermined.

Then the cluster number of the destination cluster is determined in view of the number of clusters used by the RAS information file (STEP 3). It is checked whether another file occupies the destination area or not (STEP 4). At this point, when another file occupies the destination area (YES for STEP 5), a vacant area corresponding to the number of clusters occupied by the another file is searched for (STEP 6). Then the another file is transferred into the vacant area which has been searched (STEP 7). Thereafter the RAS information file is transferred into the rearmost area (STEP 8).

On the other hand, in the case that no file has occupied the destination area (NO for STEP 5), the RAS information file is transferred to the rearmost area (STEP 8).

According to those processes, after the first copying (overwriting) of the OS or the like, the RAS information file is stored into the rearmost area of the storage region in the storage device which stores the operating system and the like. Therefore the loss of the RAS information file can be avoided, which would otherwise be caused by subsequent copying (overwriting) of the operating system and the like. Furthermore a RAS information file is not newly generated after the first copying (overwriting) of the OS and the like. RAS information is continuously recorded into the RAS file generated after the first copying (overwriting).

Next, the detail of the processes in FIG. 3 is further explained by using examples shown in FIGS. 4A to 4D. FIGS. 4A to 4D show a storage area of the storage device (11). They are figures showing processes to generate and store the RAS information in the case that the RAS information file has not been generated.

Figure 4A:
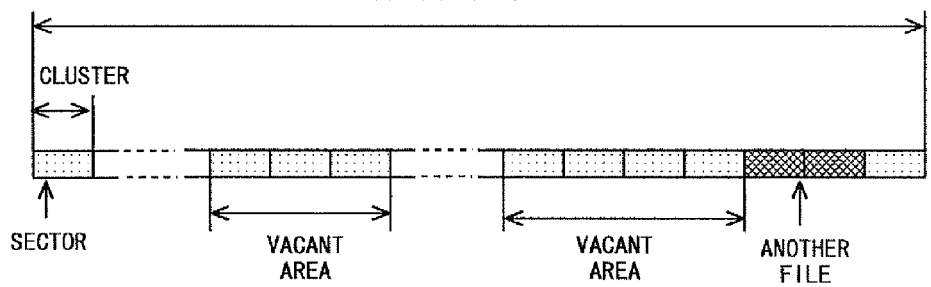
FIG. 4A is a figure showing an outline at the time when a RAS information file is stored at the rearmost area of the storage area in the storage device which stores an operating system and the like, and showing a status where the RAS information is not stored in a storage device (11)
Figure 4B:
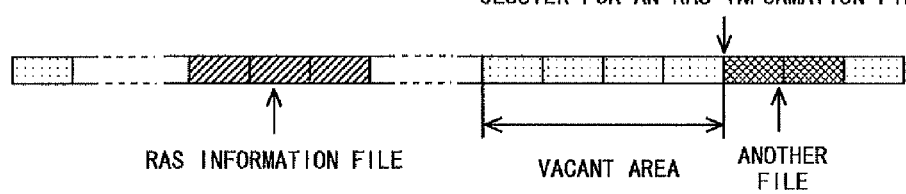
FIG. 4B is a figure showing a state where another file occupies a target cluster in the storage device (11)
Figure 4C:
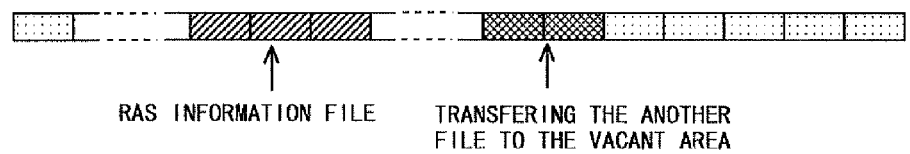
FIG. 4C is a figure showing a state where the other file moves from the rearmost area to an arbitrary vacant-area

First, the CPU (10) checks whether the RAS information file is stored in the storage device (11) (STEP 1 in FIG. 3). At this point the CPU (10) generates the RAS information file in a vacant area in the storage device (11) (STEP 2 in FIG. 3) in the case that an RAS information file has not been stored in the storage device (11) (NO for STEP 1 in FIG. 3) as shown in FIG. 4A. Therefore the RAS information file is generated in the storage device (11) as shown in FIG. 4B.

Next CPU (10) determines the cluster number of the destination cluster for the RAS information file (STEP 3 in FIG. 3). Then it is checked whether another file occupies the storage area of the cluster number of the destination cluster (STEP 4 in FIG. 3). At this point, the another file occupies the destination cluster in the storage area (11) in the example of FIG. 4B. Therefore the CPU (10) determines that another file occupies the destination cluster (YES for STEP 5 in FIG. 3), and searches a vacant area for the another file (STEP 6 in FIG. 3).

Figure 4D:
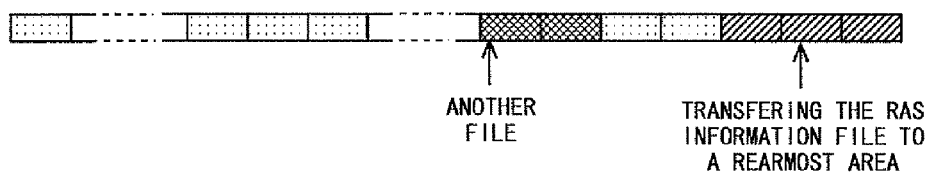
FIG. 4D is a figure showing a state where the RAS information file is stored into the rearmost area.

Then the another file is transferred into the searched vacant area (STEP 7 in FIG. 3). Therefore the another file is moved from the rearmost area to the arbitrary vacant area as shown in the FIG. 4C. Thereafter CPU (10) transfers the RAS information file to the rearmost area (STEP 8 in FIG. 3). Herewith the RAS information file is stored into the rearmost area of the storage area (11) as shown in FIG. 4D.

In this way, by the POS device according to the present embodiment, log information, RAS information and the like is stored in the storage device (11) which stores the operating system (OS), the application program and the like. Therefore the POS system is not limited to be equipped with any non-volatile memory to storage the log information, the RAS information and the like, which is different from the storage device to store the operating system (OS), the application program and the like.

In the above embodiment, the log and RAS information is stored in the storage device which stores the operating system (OS), the application program and the like. However it is possible to store only RAS information into the storage device which stores the operating system (OS), the application program and the like, when the log information is not limited to be stored.

While the present invention has been described above with reference to the exemplary embodiments, the present invention is not limited to the above exemplary embodiments. The configuration and details of the present invention can be modified in various manners which can be understood by those skilled in the art within the scope of the invention.

This application claims the benefit of priority, and incorporates herein by reference in its entirety, the following Japanese Patent Application No. 2012-052835 filed on Mar. 9, 2012.

INDUSTRIAL APPLICABILITY

The present invention may be applied to an electronic device which requires log acquisition.

REFERENCE SIGNS LIST

10 CPU
11 STORAGE DEVICE
12 ROM
13 RAM
14 RTC
15 TOUCH PANEL TYPE DISPLAY UNIT FOR AN OPERATOR
16 KEYBOARD
17 CARD READER
18 HANDY SCANNER
19 PRINTER
20 DISPLAY UNIT FOR A CLIENT
20 NETWORK INTERFACE

The invention claimed is:

1. A Point Of Sales system which is not equipped with any non-volatile memories for storing log information and Reliability Availability Serviceability information, wherein
the log information is a record of a process and an operation;
the Reliability Availability Serviceability information is information pertaining to a hardware life-time which is used for estimating the hardware life-time and needs to be continuously recorded unless the hardware constituting the Point of Sale device is replaced to a new component;

the log information and the Reliability Availability Serviceability information is stored into a storage device which stores an operating system and an application program; and the Reliability Availability Serviceability information is stored in a rearmost area of a storage area in the storage device; wherein the rearmost area is an area which is not overwritten with the operating system and the application program.

2. The Point Of Sales system according to claim 1, wherein it is checked whether the Reliability Availability Serviceability information is stored in the storage device;

in the case that the Reliability Availability Serviceability information has not been stored, a Reliability Availability Serviceability information file is generated in a vacant area in the storage device in order to determine the cluster number of the destination cluster; and it is checked whether another file occupies the storage area of the cluster number of the destination cluster;

in the case that it is determined that the another file occupies, a vacant area for destination of the another file is searched; and after the another file is moved to the searched vacant area, the Reliability Availability Serviceability information is stored in the storage area of the cluster number of the destination cluster.

3. The Point Of Sales system according to claim 1, wherein the log information is stored into a rearmost area of a storage area in the storage device; wherein the rearmost area is an area which is not overwritten with the operating system and the application program.

4. The Point Of Sales system according to claim 2, wherein the log information is stored into a rearmost area of a storage area in the storage device; wherein the rearmost area is an area which is not overwritten with the operating system and the application program.

* * * * *